United States Patent
Smits

(10) Patent No.: US 6,657,764 B1
(45) Date of Patent: Dec. 2, 2003

(54) VERY LARGE ANGLE INTEGRATED OPTICAL SCANNER MADE WITH AN ARRAY OF PIEZOELECTRIC MONOMORPHS

(75) Inventor: Johannes G. Smits, Milton, MA (US)

(73) Assignee: The Trustees of Boston University, Boston, MA (US)

( * ) Notice: Subject to any disclaimer, the term of this patent is extended or adjusted under 35 U.S.C. 154(b) by 0 days.

(21) Appl. No.: 09/700,633

(22) PCT Filed: Mar. 17, 2000

(86) PCT No.: PCT/US00/07075

§ 371 (c)(1),
(2), (4) Date: Nov. 16, 2000

(87) PCT Pub. No.: WO00/55666

PCT Pub. Date: Sep. 21, 2000

Related U.S. Application Data

(60) Provisional application No. 60/124,982, filed on Mar. 18, 1999.

(51) Int. Cl.[7] .......................... G02B 5/08; G02B 7/182; G02B 26/08; H01L 41/04; H01L 41/08
(52) U.S. Cl. .................... 359/224; 359/847; 359/849; 359/872; 359/900; 310/330; 310/331; 310/332
(58) Field of Search .................... 359/224, 900, 359/847, 849, 872; 310/323.01, 330–333, 311, 328

(56) References Cited

U.S. PATENT DOCUMENTS

| | | | |
|---|---|---|---|
| 4,421,381 A | * 12/1983 | Ueda et al. | |
| 5,245,464 A | 9/1993 | Jensen | 359/224 |
| 5,268,784 A | * 12/1993 | Chaya | |
| 5,268,974 A | 12/1993 | Hikita et al. | 385/19 |
| 5,543,956 A | * 8/1996 | Nakagawa et al. | |
| 5,579,148 A | 11/1996 | Nishikawa et al. | 359/214 |
| 5,629,790 A | * 5/1997 | Neukermans et al. | |
| 5,661,591 A | * 8/1997 | Lin et al. | |
| 5,767,666 A | * 6/1998 | Asada et al. | |
| 5,912,608 A | 6/1999 | Asada | |
| 5,920,417 A | * 7/1999 | Johnson | |
| 6,049,407 A | 4/2000 | Melville | 359/198 |
| 6,091,050 A | * 7/2000 | Carr | |
| 6,107,724 A | 8/2000 | Tamai et al. | 310/323 |
| 6,134,042 A | 10/2000 | Dhuler et al. | 359/224 |
| 6,201,629 B1 | * 3/2001 | McClelland et al. | |
| 6,275,324 B1 | * 8/2001 | Sneh | |
| 6,351,330 B2 | * 2/2002 | Ko et al. | |

FOREIGN PATENT DOCUMENTS

JP 1-195406 * 8/1989

* cited by examiner

Primary Examiner—Ricky D. Shafer
(74) Attorney, Agent, or Firm—Weingarten, Schurgin, Gagnebin & Lebovici LLP

(57) ABSTRACT

A micromachined mirror scanning system having plural benders of morphs and support arms between a mirror surface of silicon and a surrounding frame. Electrical energization of the morphs with a DC voltage under the control of a computer provides a large range of mirror orientations and positions and the devices occupy a small planar package. The devices of the invention are formed from a single wafer of silicon and have low response times and large scan angles.

5 Claims, 7 Drawing Sheets

VERY LARGE ANGLE INTEGRATED OPTICAL SCANNER MADE WITH AN ARRAY OF PIEZOELECTRIC MONOMORPHS

CROSS REFERENCE TO RELATED APPLICATIONS

This application is a national stage application filed under 35 U.S.C. 371 of PCT/US00/07075 filed on Mar. 17, 2000

This application claims priority under 35 U.S.C. §119(e) to Provisional Application No. 60/124,982, filed Mar. 18, 1999; the disclosure of which is incorporated herein by reference.

ACKNOWLEDGEMENT OF GOVERNMENT SUPPORT

This invention was made with government support under Contract Number N00014-96-2-0008 awarded by the Office of Naval Research. The Government has certain rights in the invention.

BACKGROUND OF THE INVENTION

Mirrors for the redirection of light find applications in a great many functions including card readers, displays among others. The miniaturization of many functions and their increasing complexity places space and frequency response demands on such mirror systems. The uses for such mirrors demands that they be capable of two axis motion with pointing angles under computer control. Furthermore high speed operation is increasingly in demand.

Systems of today typically use bulky mechanical designs filling a significant volume or are only capable of mirror motion about one axis.

BRIEF SUMMARY OF THE INVENTION

The present invention takes advantage of the miniaturization and cost advantages of micromachining to produce scanning mirror systems in planar silicon arrays on wafers with large scan angles, high frequency responses and thus fast scanning rates. The advantages of high efficiency production are also available through this fabrication technique.

The invention supports a mirrored silicon surface from one or more support arms attached to a frame of silicon, all of the same wafer. The support has regions with depositions that provide bender or piezoelectric morph functions when energized with a voltage. Intermediate platforms or junction points allow the supports to be a combination of several arms, some having morph functions and others not. This provides an amplification or leverage function to the bending action of each morph, achieving very large scan angles per applied volt. The small size, relative rigidity of silicon allow high resonant frequencies and thus fast response times. The flexibility of micromachining allows multi axis mirror motion and computer control. Using combinations of arm segments of morph and neutral functions a wide range of functions can be achieved in a final product.

Large scale wafer fabrication techniques allow many scanning systems to be made on a single wafer for further efficiencies in the production of the scanners. The use of a DC voltage for the scanner reduces vibration effects.

DESCRIPTION OF THE DRAWING

These and other features of the invention will be made clear in the following description and accompanying drawing of which.

DESCRIPTION OF THE PREFFERED EMBODIMENT

Figure 1:
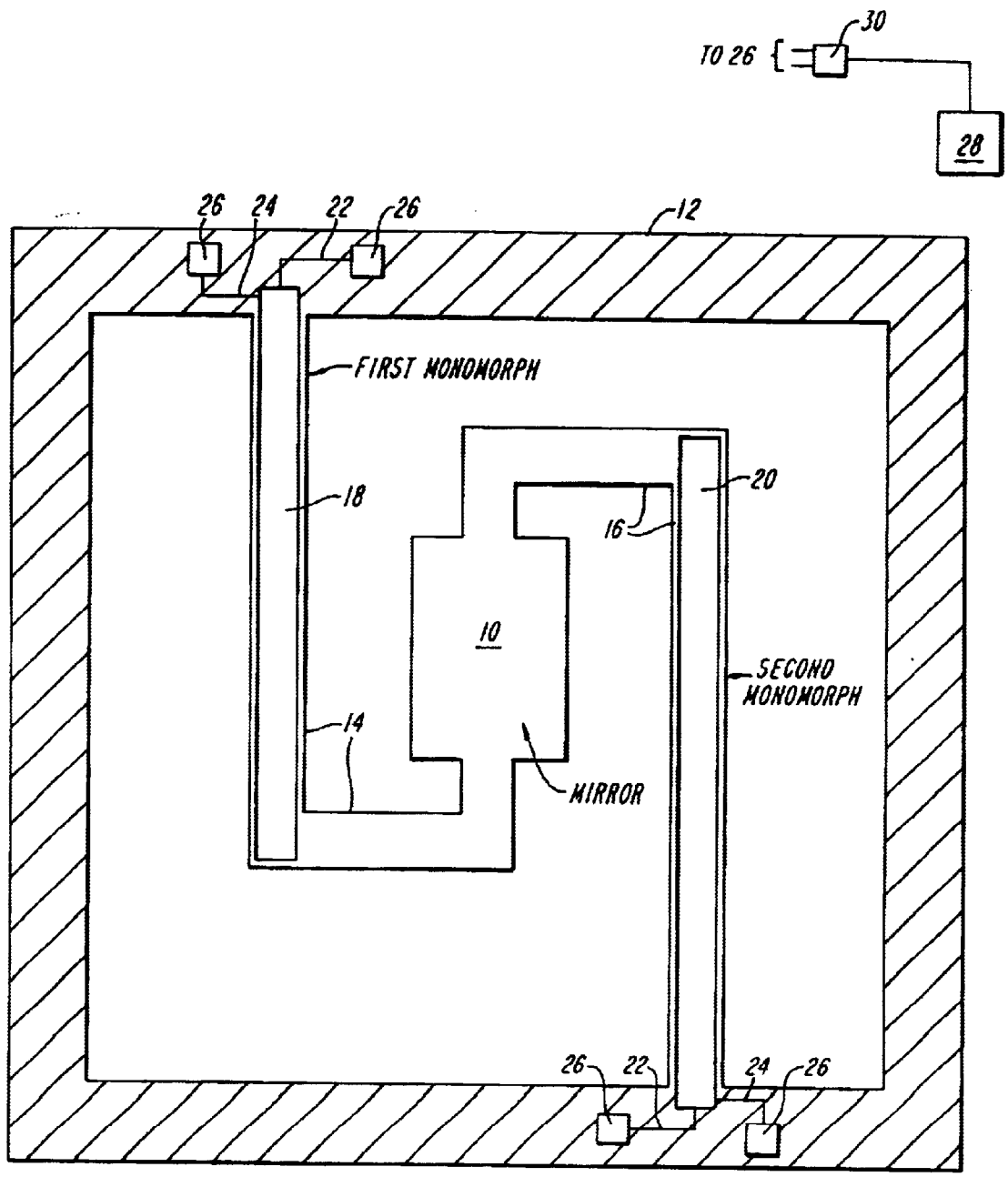
FIG. 1 is a diagram of a two morph mirror scanning system of the inventions.

The present invention utilizes micromechanically formed scanning mirror systems as illustrated in FIG. 1. Shown there is a mirrored silicon platform or area 10 supported and etch released from a silicon frame 12 by respective silicon support arms 14 and 16. Overlying the arms 14 and 16 are respective morphs 18 and 20 which may be monomorphs or bimorphs (the term morph being used to represent either or other equivalent structures herein) The morphs comprise piezoelectric depositions formed during the micromachining of the device as described below. As is know in the art the morphs 14 and 16 for use as benders, have upper and lower electrical connections 22 and 24 to terminals 26, all formed as metalizations on the frame 12. The frame 12 is shown schematically and typically would be of greater extent in both directions of the plane of the page.

Figure 2:
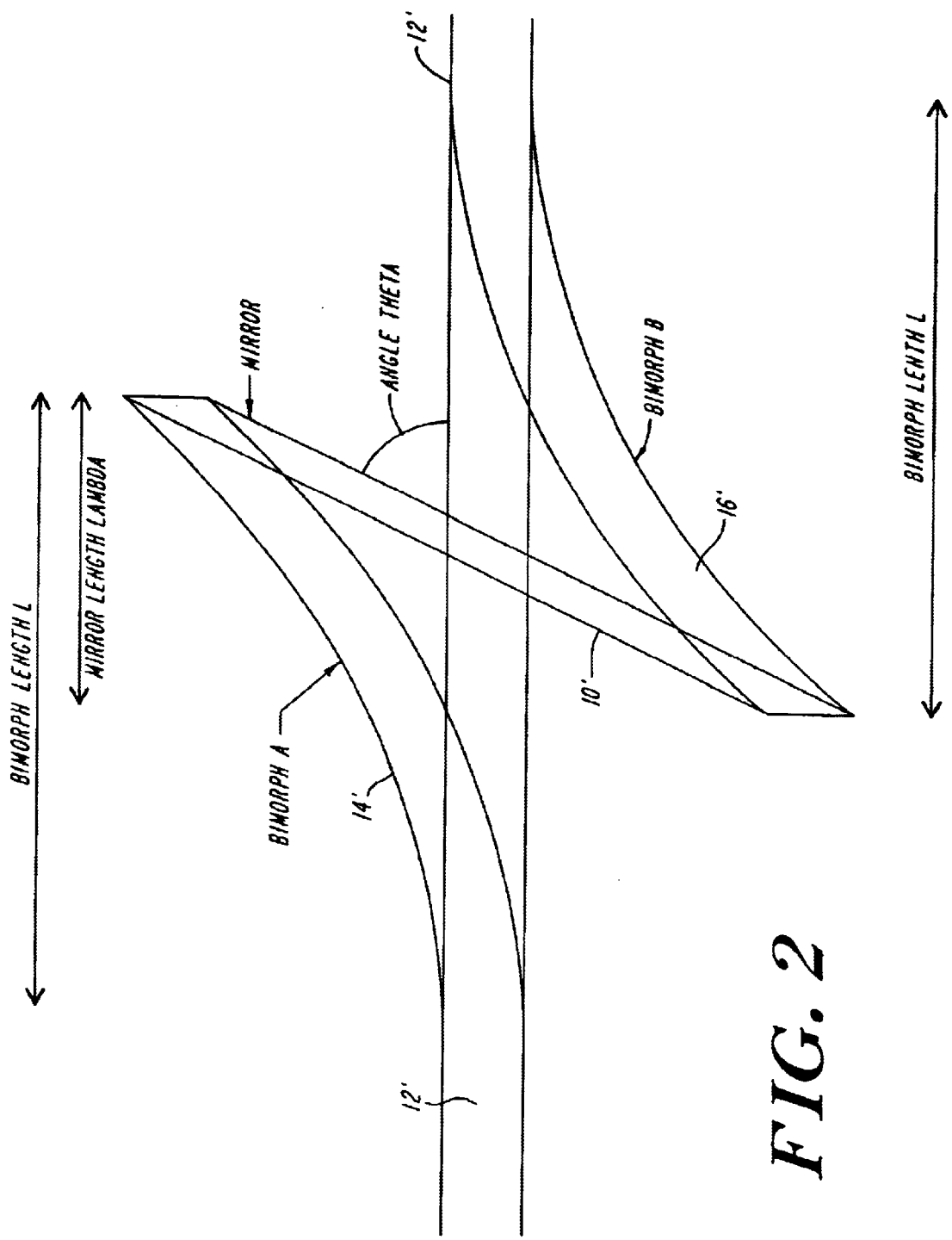
FIG. 2 illustrates the operation of the device of FIG. 1.

In FIG. 2 there is shown a diagrammatic illustration of the principle of operation of a scanning mirror according to the invention in which there is a mirror 10' supported on arms 14' and 16' within a frame 12'. As the morphs or bimorphs of the arms 14' and 16' are electrically actuated to bend in opposite directions, the mirror 10' will be tilted a considerable distance. By varying and controlling the signals applied to the morphs, the degree of bending the angle of inclination of the mirror 10' can be precisely set or scanned with knowledge of the exact position of the mirror. For this purpose the system of the invention is normally operated with a micro or other processor 28 which controls the magnitude of the signals applied to terminals 26, with or without interfacing drivers 30.

Figure 3:
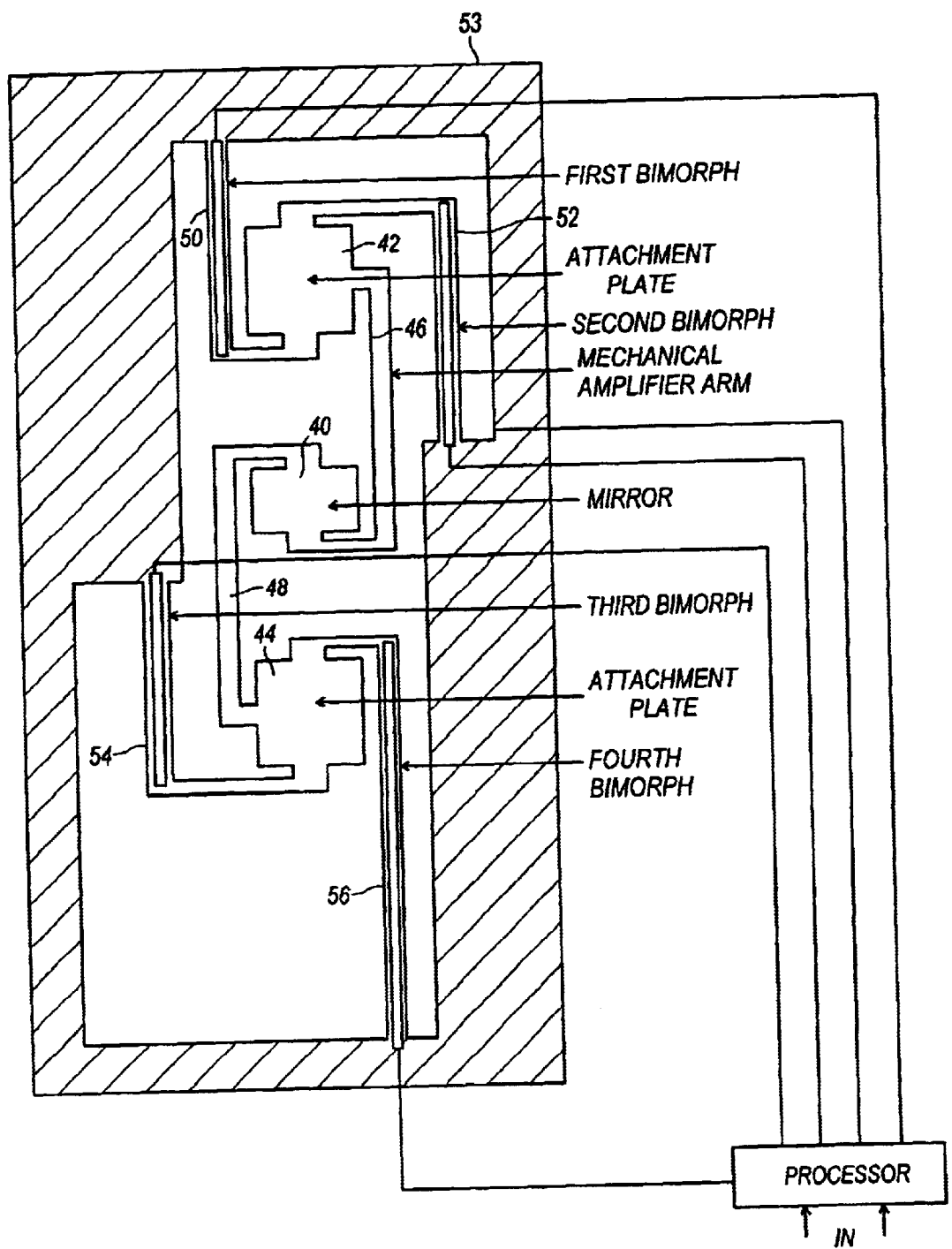
FIG. 3 is a diagram of a four morph mirror scanning system of the invention.
Figure 4:
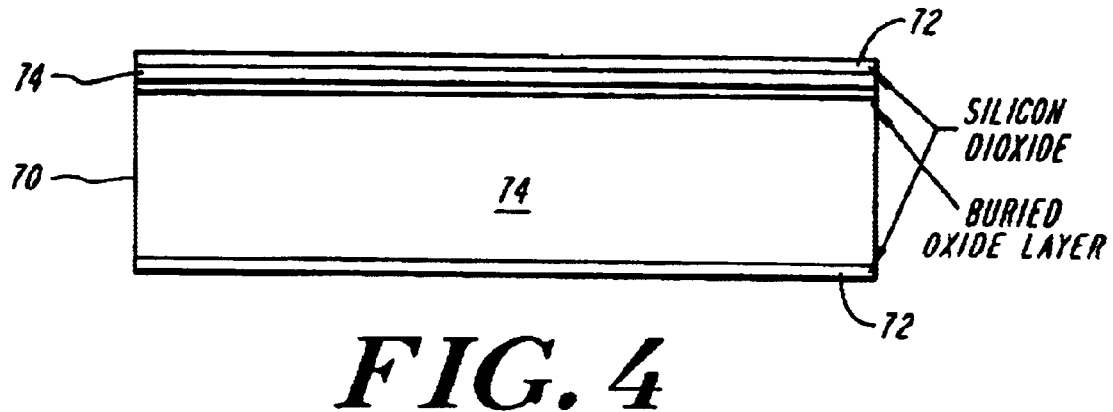
FIGS. 4–11 illustrate a fabrication process for the scan mirrors of the present invention.

FIG. 3 illustrates the invention in four morph arrangement in which a central mirror 40 is first connected to first and second platforms 42 and 44 by "J" shaped support arms 46 and 48 that connect mirror 40 top and bottom edges to platform 42 and 44 left and right hand sides. The top and bottom edges of platforms 42 and 44 are respectively connected by support arms 50, 52, 54 and 56 to a frame 53. The support arms 50, 52, 54, and 56 are made into morphs by depositions of layers forming piezoelectric benders. By actuating the morphs of arms 50 and 52 in one polarity and those of arms 54 and 56 in an opposite polarity, the mirror can rotate about an axis passing left to right while actuation of benders of arms 50 and 54 in one polarity and those of 52 and 56 in an opposite polarity, the mirror can be tilted about an axis running top to bottom in the page.

Figure 5:
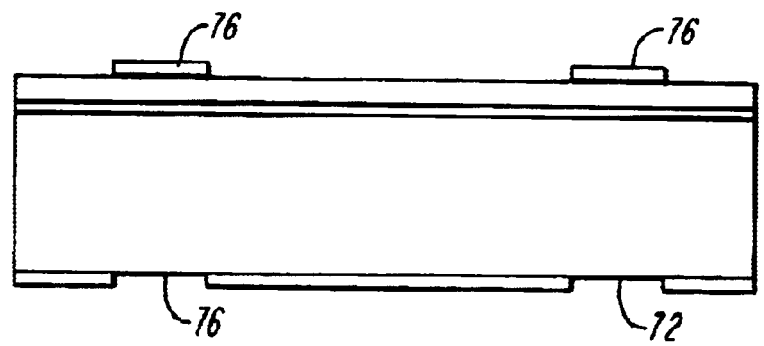
Figure 6:
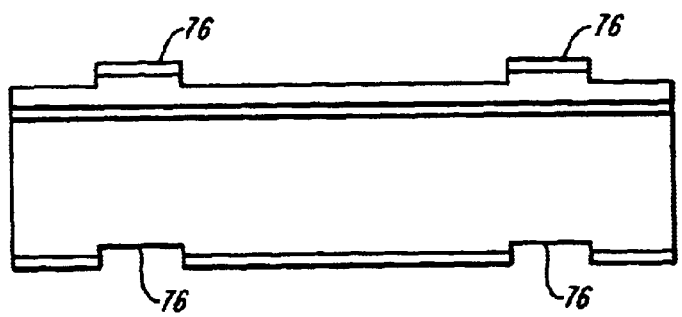
Figure 7:
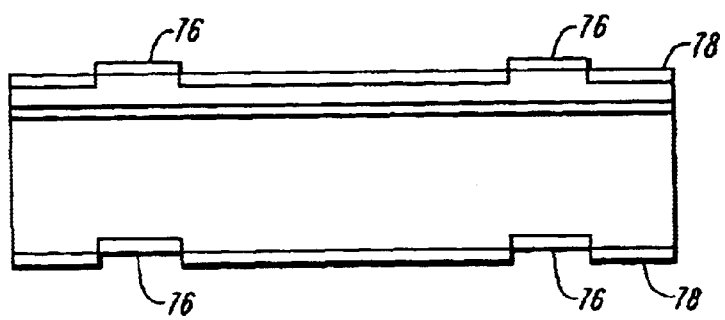
Figure 8:
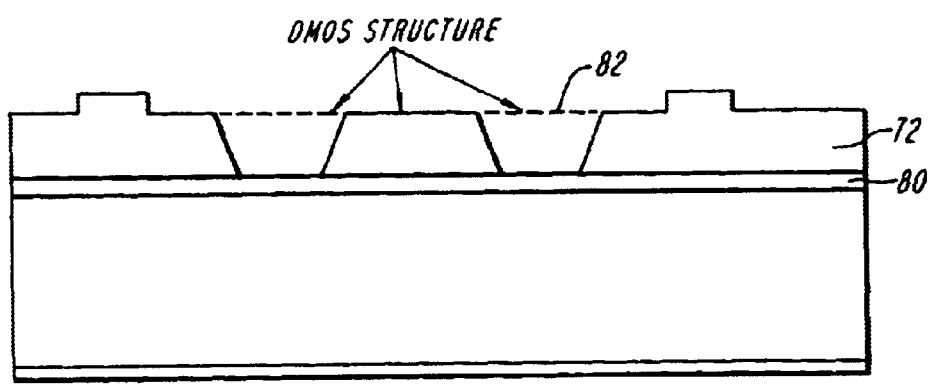
Figure 9:
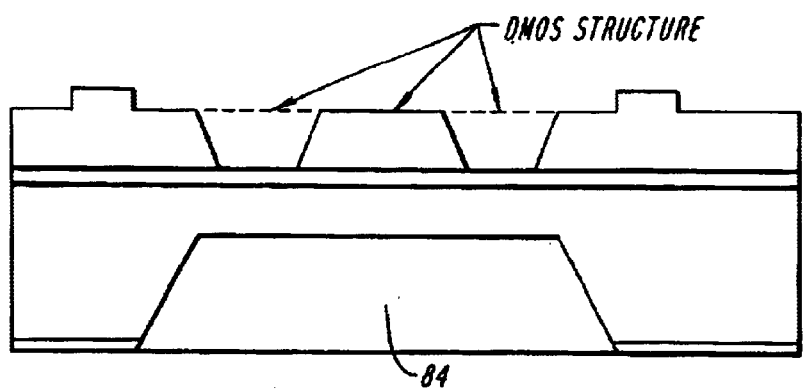
Figure 10:
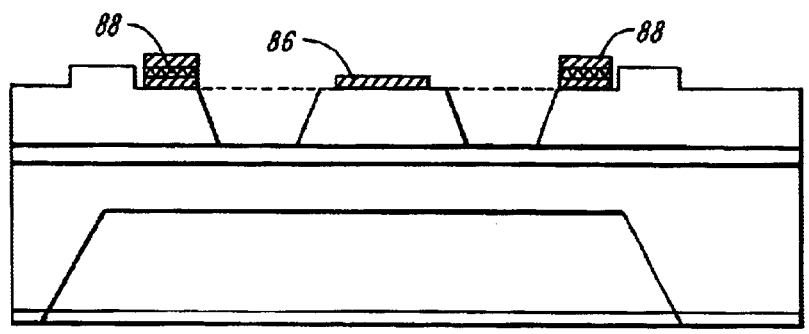
Figure 11:
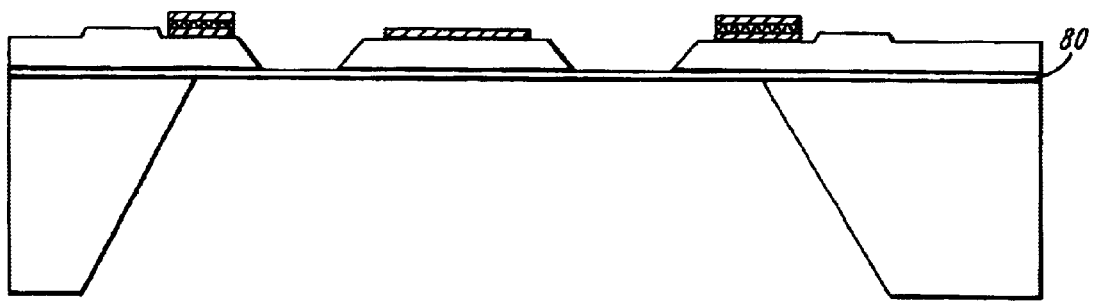

FIGS. 4–11 illustrate steps in the preparation of a silicon wafer to provide the final scanning structure. These illustrations are generic, in nature and show the processes used, but are exemplary only and not to be taken as limiting in the actual structure prepared. From a silicon on glass structure wafer 70 available in the industry insulating layers 72 are formed over the two silicon regions 74. These insulating layers 72 are apertured as shown in FIG. 5 for the creation of alignment marks 76 and the silicon around them is then etched back in FIG. 6. Finally a new insulating layer 78 is formed. In FIG. 8, the silicon of the top device layer is etched back to the internal insulator layer 80 in regions 82 to isolate the portions of the structure that are to be free to move in the final device. A back side etch leaves a deep 350 micron void. Those portions of the top surface that are to function as a reflector 86 or morphs 88 are plated in FIG. 10, the morphs being a platinum electrode—PZT bender layer sandwich. In FIG. 11 the back etch is extended to the insulating layer 80 which is in turn etched to free the structure for motion as described above and below.

Figure 12:
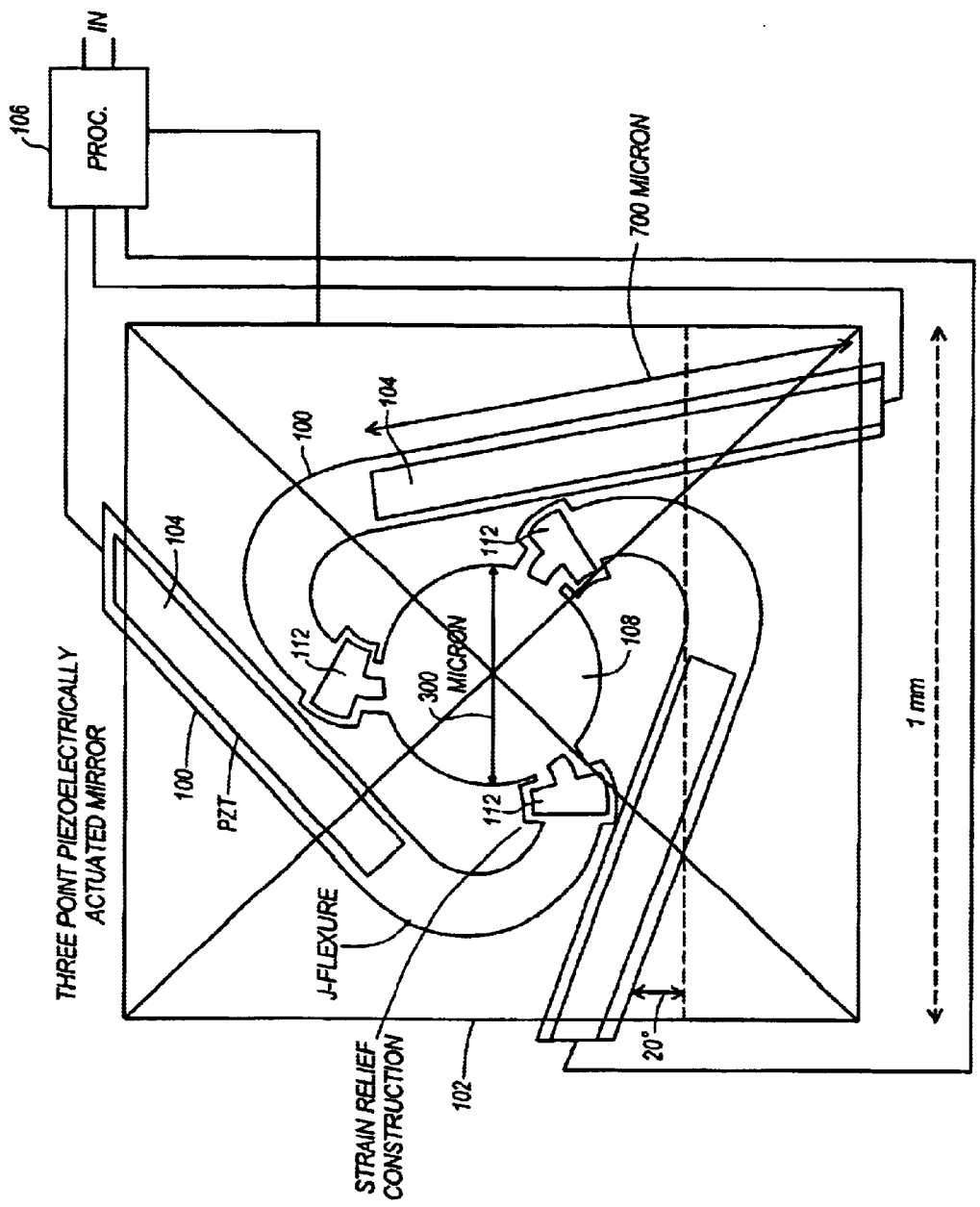
FIG. 12 illustrates a three morph mirror system.

FIG. 12 illustrates a further embodiment of the invention in which three "J" shaped arms 100, completing nearly a 180 degree curvature and angled at 120 degrees from each other, supported from the edge 102 of a frame. The initial linear portion 104 of the arms 100 is plated to function as morphs or benders. A computation system 106 drives the morphs and accomplishes any coordinate transformations to adjust orthogonal drive signals to the 120 degree angles. A mirror 108 is formed in the center as discussed before.

Stress relief structures 112 are formed of silicon between the ends of the arms 100 and the mirror 108 to accommodate a difference in slope between the sides of the arms 100 at the juncture with the mirror due to the substantial curving of the arms 100 at the end and the 120 degree arm placement. Similar stress relief structures may be added to the other designs. The stress relief structures comprise a widening of the arms with the centers etched out leaving only outer bands for the attachment over a few degrees of curvature.

Of particular advantage to such a structure is the fact that if the morphs or bendrers on the arm portions 104 are electrically driven to bend in the same direction an identical amount, or nearly so, the mirror 108 is given a bending moment at its edges where the arms attach. This results in the mirror 108 being bent slightly in a convex or concave shape which has usefulness in providing focussing or defocussing effects on light beams reflected thereby.

What is claimed is:

1. A micromechanical system of one or more platforms and plural supports wherein at least one said platform is adapted for having a reflective surface, said system comprising:

a frame holding one or more of said plural supports at respective ends thereof distant from a corresponding platform;

morphs coextensive and associated with a portion only of respective ones of a plurality of said plural supports, other portions of said plural supports being angled to the portion to which said morps are coextensive, and wherein said supports are "J" shaped.

2. The system of claim 1, wherein said supports number three in total, oriented at 120 degrees from each other.

3. The system of claim 2, wherein one or more said platform takes on a convex or concave shape under the influence of a similar bending of said morphs.

4. A method for adjusting the focusing effect of a reflective surface as claimed in claim 2, comprising the step of:

causing said morphs to bend in substantially the same direction and magnitude to apply a bending moment to edges of said reflective surface causing a bending thereof in a convex or concave shape.

5. A method of forming a scanning system including the steps of forming a micromechanical system from silicon, wherein said micromechanical system includes one or more platforms and plural silicon supports, wherein at least one said platform is adapted for having a reflective surface, and wherein said micromechanical system further includes a frame holding one or more of said plural silicon supports at respective ends thereof distant from a corresponding platform, wherein said micromechanical system further includes morphs coextensive and associated with a portion only of respective ones of a plurality of said plural silicon supports, other portions of said plural silicon supports being angled to the portion to which said morphs are coextensive, and further including the step of forming said morphs as layered piezoelectric elements of said silicon supports between said frame and said reflective surface.

* * * * *